Figure 1:
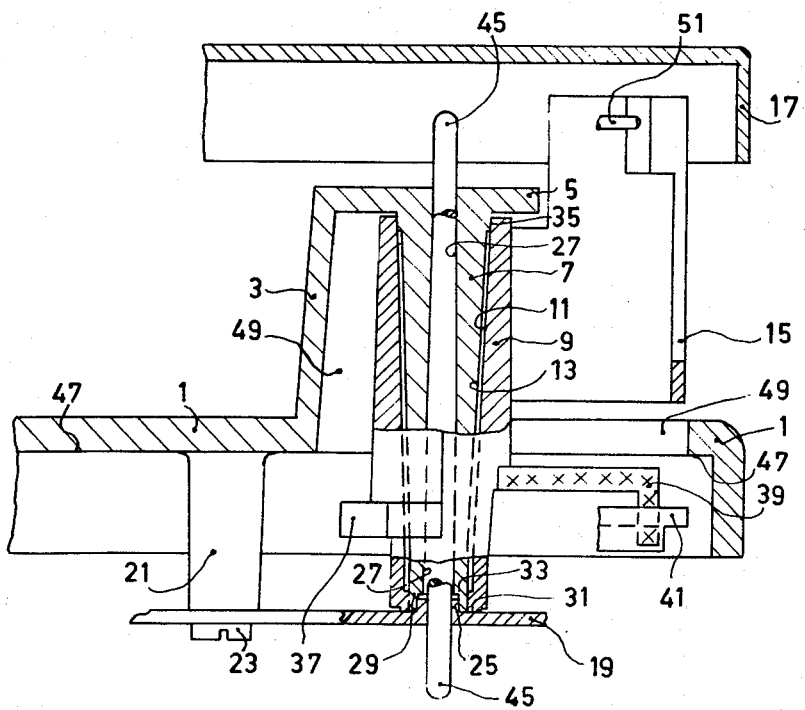

United States Patent [19]
Freiter

[11] 3,934,885
[45] Jan. 27, 1976

[54] BEARING OF A PICK-UP ARM FOR A RECORD PLAYER

[75] Inventor: Gerhard Freiter, Berlin, Germany

[73] Assignee: U.S. Philips Corporation, New York, N.Y.

[22] Filed: Sept. 18, 1973

[21] Appl. No.: 398,494

[30] Foreign Application Priority Data
Sept. 27, 1972 Germany............................ 2247446

[52] U.S. Cl............................. 274/23 R; 274/23 X
[51] Int. Cl.²......................................... G11B 3/10
[58] Field of Search................................ 274/23 R

[56] References Cited
UNITED STATES PATENTS

| | | | |
|---|---|---|---|
| 2,060,117 | 11/1936 | Proctor | 274/23 R |
| 2,954,234 | 9/1960 | Marks | 274/23 X |
| 3,363,909 | 1/1968 | Kozu et al. | 274/23 A |

*Primary Examiner*—Richard E. Aegerter
*Assistant Examiner*—Michael H. Thaler
*Attorney, Agent, or Firm*—Frank R. Trifari; David R. Treacy

[57] ABSTRACT

A pick-up arm bearing for a record player. A bearing column extends vertically downwards from a cover plate and is engaged by a bearing body of a bearing block which carries the pick-up arm, the bearing body with the bearing block being slid onto the bearing column from the underside of the cover plate, while the bearing block projects upward through an opening in the cover plate to hold the pick-up arm.

8 Claims, 2 Drawing Figures

BEARING OF A PICK-UP ARM FOR A RECORD PLAYER

The invention relates to a bearing of a pick-up arm for a record player with a cover plate, on which a bearing column which extends vertically downwards is provided for the bearing body of a bearing block which carries the pick-up arm.

Every pick-up arm of a record player or changer is pivoted to the cover plate of the apparatus by means of a bearing both in a horizontal and in a vertical direction. The bearings generally consist of a bearing column, which is disposed above the cover plate and which carries the bearing block for the pick-up arm. The bearing block is then provided with a bore which is such that the bearing block is rotatably guided by the bearing column. It is also possible for the bearing column to be disposed underneath the cover plate, the bearing column then serving as a bushing for the pick-up arm bearing block. A disadvantage of the known constructions is that one part of the bearing is to be mounted from above, while other parts such as, for example, a striker arm for the sensing means of the changing cycle and an arm for determining the set up diameter, have to be mounted from beneath, which is time-consuming and expensive.

It is an object of the invention to provide a bearing for a pick-up arm, which can be pre-assembled or which consists of one part and which in principle need be mounted from one side of the cover plate only.

According to the invention bearing block with the bearing body is slid onto the bearing column from the underside of the cover plate, the bearing body being slid through an opening in the cover plate to its upper side, and the bearing body is pivoted about the bearing column retained by a retaining member.

With such a pick-up arm bearing mounting is effected completely from beneath the cover plate, the mounting procedure merely consisting of insertion onto the bearing column and securing by means of the retaining member.

According to an embodiment of the invention, the bearing body and the bearing block consist of one integral injection molded plastic part. Other parts, such as a striker arm for the scanner of the changing mechanism and, as the case may be, a stop arm for determining the set up diameter may then simultaneously be molded on this plastic part. It may be desirable to make the scanner adjustable in the longitudinal direction. In that case, it is only required to mold on one guide for the scanner.

According to a further embodiment of the invention, the upper foot of the bearing column is raised from the cover plate by means of an upright portions of the cover plate, which supports said foot, which extends near the column, which surrounds the latter partly and which bears on the cover plate. This construction allows a part of the bearing block to be concealed in the cover plate and minimizes the height underneath the cover plate. For constructional reasons, a certain distance is required between the cover plate and the pick-up arm and this distance is obtained by means of the upright member at the bearing column and the bearing block.

According to a further embodiment of the invention, the retaining member consists of a metal plate, which is provided with a boss which engages a hole of the bearing column from underneath. Thus the retaining member also locks the lower end of the bearing column against lateral displacements. Moreover, in a further embodiment of the invention, the lifting pin for the pick-up arm may be guided through the boss of the metal plate and the bore of the bearing column.

Mounting is facilitated when the outer wall of the bearing column and the hole of the bearing body have a common downward taper.

The invention will now be described in more detail with reference to the embodiment shown in the drawing.

Figure 2:
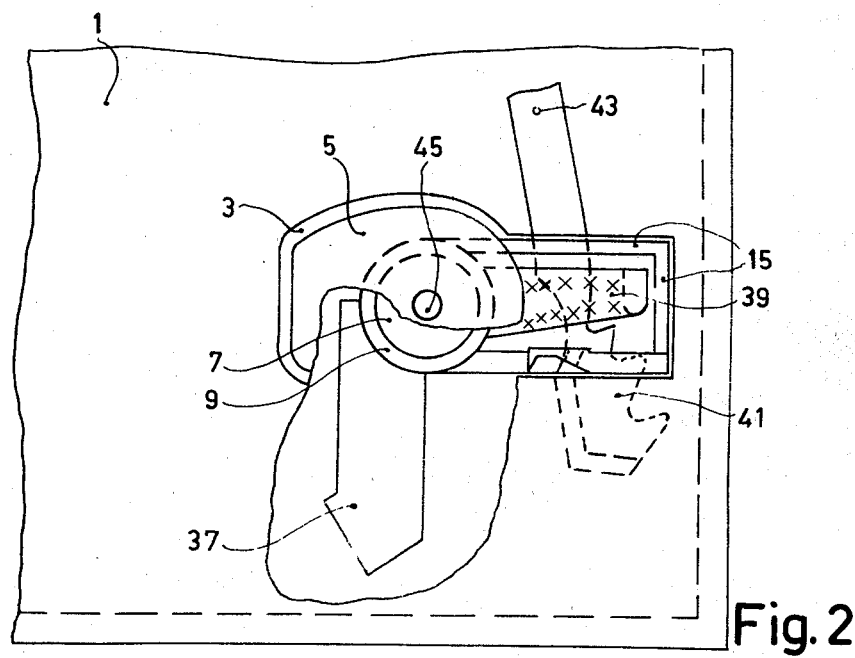

FIG. 1 is a longitudinal section of a bearing of a pick-up arm according to the invention, and FIG. 2 is a top plan view with the pick-up arm removed and a partly cut away cover plate.

The pick-up arm bearing according to the invention is mounted on the cover plate 1. From the cover plate 1 a rib 3 extends upwards, supporting the upper foot 5 of a bearing column 7. The rib 3 partly surrounds the bearing column 7. A bearing body 9 is slid onto the bearing column 7, which has a downward taper. The wall 11 of the bore of the bearing body 9 as well as the outer wall 13 of the bearing column 7 have a downward taper. The bearing body 9 together with the bearing block 15 for the pick-up arm 17 are injection molded in one piece.

A metal plate 19, which is secured to block 21 of the cover plate 1 by means of a screw 23, serves for securing the bearing body 9 to the bearing column 7. The plate 19 is provided with a boss 25, which at the underside engages a hole 27 of the bearing column 7. Thus the plate 19 unambiguously determines the position of the lower end 29 of the bearing column 7. Moreover, this plate determines the length over which the bearing body 9 is slid onto the bearing column 7. By an appropriate design of the contact faces 31 of the bearing body 9 against the metal plate 19, and of the bearing surfaces 33 and 35 between the bearing column 7 and the bearing body 9, it is assured that the pickup arm bearing runs smoothly.

A striker arm 37 is moulded on the bearing body 9, which upon rotation of the pick-up arm 17 and the bearing block 15 rotates also and may, for example, strike against a sensor for initiating a changing cycle. Said sensor is not shown because it is not essential for the invention. Further, a striker arm 39 is molded on the bearing body 9, to cooperate with a lever 41 (FIG. 2). The toothed lever 41 is pivoted in 43 and in accordance with its adjustment it ensures that the striker arm by striking against a tooth or an opening between two teeth limits the rotary movements of the pick-up arm to set the pick-up arm drop point.

A lifting pin 45 is guided through the bore 27 of the bearing column 7 and the boss 25 and can be lifted by a lifting device of the changing mechanism, not shown, so that the pick-up arm 17 is raised.

The pick-up arm bearing according to the invention is mounted from the underside 47 of the cover plate. From this underside, the bearing body 9, the bearing block 15 as well as the striker arm 37 and the stop arm 39 are slid onto the plate 1, the bearing body and the bearing block 15 extending through an opening 49 in the cover plate 1. The striker arm 37 and the stop arm 39 remain underneath the plate 1. Subsequently, the metal plate 19 is screwed to the block 21, so that the pick-up arm bearing is already secured. From the top of the cover plate 1 only the pick-up arm 17 need be secured, which is effected in a manner well known in the art using a pin 51, which connects the bearing block 15 to the pick-up arm 17.

What is claimed is:

1. A pick-up arm bearing assembly for a record player with a cover plate, comprising a cover plate having first, second and third portions, said first portion being raised above said second portion, said third portion connecting between said first and second portions, said second portion having an opening therethrough below said first portion, a part of said opening extending beyond said first portion; a bearing column having a vertical axis, said column mounted below said first portion of the cover plate and extending downward, said cover opening part being in spaced relationship with said bearing column axis; a bearing body fitted coaxially over said bearing column to permit rotation about the axis of said column; a retaining member; means for mounting said retaining member under said cover plate so as to retain said body on said column; and bearing block means for attaching a pick-up arm for pivotal motion about a horizontal axis, comprising a lower portion disposed below the cover plate and connected to said bearing body and an upper portion having a cross-section in a horizontal plane smaller than said part of said opening and in spaced relationship with said axis corresponding to said spaced relationship, said upper portion projecting upward above said part of said opening in the cover plate, said upper portion comprising means for pivotally mounting a pick-up arm about a horizontal axis, whereby said bearing body, bearing block means and retainer can be assembled to the record player from below the cover plate.

2. An assembly as claimed in claim 1, wherein said bearing body and bearing block means are formed by an integral plastic part.

3. An assembly as claimed in claim 2, wherein said integral plastic part further comprises a striker arm disposed under said cover plate for contact by a scanner part of the record player when the pick-up arm bearing is in a pre-determined position to initiate a record changing cycle.

4. An assembly as claimed in claim 2, wherein said integral plastic part further comprises a striker arm disposed under said cover plate for stopping rotation of said pick-up arm bearing at a predetermined position to determine the pick-up arm dropping diameter.

5. An assembly as claimed in claim 1, wherein said third portion of said cover plate partly surrounds said bearing body.

6. An assembly as claimed in claim 5, wherein said bearing column has a hole at its lower end, and said retaining member comprises a boss engaging the hole at the lower end of the bearing column whereby said retaining member provides lateral support to the lower end of the bearing column.

7. An assembly as claimed in claim 6, wherein said retaining member and said bearing column boss each have a through hole for accepting a lifting pin for the pick-up arm.

8. An assembly as claimed in claim 6, wherein said bearing column has an outer bearing wall and said bearing body has an inner bearing wall, said bearing walls having a common taper downward, whereby said bearing body may easily be slipped over said bearing column.

* * * * *